United States Patent
Tian et al.

(10) Patent No.: US 9,633,473 B2
(45) Date of Patent: Apr. 25, 2017

(54) EFFICIENT COMPRESSION OF 3D MODELS BASED ON OCTREE DECOMPOSITION

(75) Inventors: Jiang Tian, Beijing (CN); Wenfei Jiang, Beijing (CN); Kangying Cai, Beijing (CN)

(73) Assignee: Thomson Licensing, Issy les moulineaux (FR)

( * ) Notice: Subject to any disclaimer, the term of this patent is extended or adjusted under 35 U.S.C. 154(b) by 251 days.

(21) Appl. No.: 14/372,922

(22) PCT Filed: Feb. 9, 2012

(86) PCT No.: PCT/CN2012/070982
§ 371 (c)(1),
(2), (4) Date: Nov. 13, 2014

(87) PCT Pub. No.: WO2013/117001
PCT Pub. Date: Aug. 15, 2013

(65) Prior Publication Data
US 2015/0103073 A1 Apr. 16, 2015

(51) Int. Cl.
*G06T 17/00* (2006.01)
*G06T 9/00* (2006.01)
(Continued)

(52) U.S. Cl.
CPC ............ *G06T 17/005* (2013.01); *G06T 9/001* (2013.01); *G06T 9/40* (2013.01); *G06T 15/04* (2013.01);
(Continued)

(58) Field of Classification Search
None
See application file for complete search history.

(56) References Cited

U.S. PATENT DOCUMENTS 6,885,774 B2   4/2005   Ammicht et al.
6,943,789 B2   9/2005   Perry et al.
(Continued)

FOREIGN PATENT DOCUMENTS

CN   1684109   10/2005
CN   101271591   9/2008
(Continued)

OTHER PUBLICATIONS

Boada et al: "Multiresolution volume visualization with a texture-based octree"; Visual Computer Springer-Verlag Germany, 2001; ISSN: 0178-2789;retrieved from the Internet on Aug. 17, 2015: URL: http://moving.cs.upc.edu/papers/Multiresolution2.pdf.
(Continued)

*Primary Examiner* — Kee M Tung
*Assistant Examiner* — Xin Sheng
(74) *Attorney, Agent, or Firm* — Brian J. Dorini; Xiaoan Lu

(57) ABSTRACT

To reduce the entropy of occupancy codes of an octree and improve compression efficiency, the present principles provide a method and an apparatus for traversing sub-cells in a cell according to the geometrical property of 3D models. That is, a surface smoothness measure is calculated for each sub-cell and the sub-cells are traversed in a pre-determined order of surface smoothness measures. To compute the surface smoothness measure, a sub-cell is connected to neighboring cells of its parent cell to form triangles and angles. Subsequently, the triangle areas or angular measures are used to compute the surface smoothness measure. When the connectivity information is not available in the 3D model data, the present principles also provide a method and an apparatus for estimating the connectivity.

19 Claims, 11 Drawing Sheets

(51) Int. Cl.
| | |
|---|---|
| G06T 9/40 | (2006.01) |
| H04N 19/134 | (2014.01) |
| H04N 19/129 | (2014.01) |
| H04N 19/96 | (2014.01) |
| H04N 19/91 | (2014.01) |
| G06T 15/04 | (2011.01) |

(52) U.S. Cl.
CPC ......... *H04N 19/129* (2014.11); *H04N 19/134* (2014.11); *H04N 19/91* (2014.11); *H04N 19/96* (2014.11)

(56) References Cited

U.S. PATENT DOCUMENTS

| | | | |
|---|---|---|---|
| 7,280,106 | B2 | 10/2007 | Hong et al. |
| 7,406,361 | B2 | 7/2008 | Ohmori et al. |
| 8,027,545 | B2 | 9/2011 | Lee et al. |
| 8,558,834 | B2 | 10/2013 | Lee |
| 2008/0205779 | A1 | 8/2008 | Dogaru |
| 2012/0029882 | A1* | 2/2012 | Bommes ............ G06F 17/5018 703/1 |
| 2014/0185668 | A1 | 7/2014 | Jiang et al. |

FOREIGN PATENT DOCUMENTS

| | | |
|---|---|---|
| CN | 101377857 | 6/2010 |
| EP | 2403257 | 1/2012 |
| JP | 2008538435 | 10/2008 |
| JP | 2009151754 | 7/2009 |
| KR | 1053911 | 8/2011 |
| WO | WO03016031 | 2/2003 |
| WO | WO2006110002 | 10/2006 |
| WO | WO2010/151049 | 12/2010 |
| WO | WO2010149492 | 12/2010 |
| WO | WO2011044713 | 4/2011 |
| WO | WO2013/026210 | 2/2013 |

OTHER PUBLICATIONS

Huang et al: "Octree-based progressive geometry coding of point clouds";Proc. IEEE/Eurographics Symp. Point-Based Graphics 2006, Jul. 2006;retrieved from the Internet on Aug. 17, 2015:URL: http:// graphics.ics.uci-edu/upload/PBG06Yan.pdf.

Peng et al: "Progressive geometry Encoder using octree-based space partitioning";2004 IEEE International Conference on Multimedia and Expo: Jun. 27-30, 2004, Taipei, Taiwan, IEEE Operations Center, Piscataway, NJ, vol. 1, Jun. 27, 2004, pp. 1-4;DOI: 10.1109/ICME.2004.1394110, ISBN: 978-0-7803-8603-7.

Wakatsuki, "A Multi-Scale Patching Method for Partial Fitness Control of VR Object Shape," Incorporated Association of The Institute of Electronics, Information and Communication Engineering, May 1, 2003, vol. J86-D-II, No. 5, pp. 697-705.

Huang_et al: "A Generic Scheme for Progressive Point Cloud Coding"; IEEE Transactions on Visualization & Computer Graphics : vol. 14, Issue 2, Mar.-Apr. 2008, pp. 440-453.

Peng_et al: "Geometry Guided Progressive Lossless 3D Mesh Coding With Octree (OT) Decomposition"; ACM Trns. on Graphics; vol. 24, # 3' Jul. 2005, pp. 609-616.

Schnabel et al: "Octree-Based Point-Cloud Compression"; Eurographics Symposium on Point-Based Graphics, 2006, pp. 111-120.

Yan et al: "Robust Encoding of 3D Mesh Using Data Partitioning"; Proceeding of the 1999 IEEE Int'l Symposium on Circuits & Systems, Jul. 31, 1999, vol. 4, pp. 495-498.

International Search Report Dated Sep. 13, 2012.

Chen et al.: "One mesh model simplification method based on shape transform of triangles", 16th International Conference on Artificial Reality and Telexistence-Workshops (ICAT'06), pp. 529-534, 2006. IEEE Computer Society, Nov. 29-Dec. 1, 2006.

Hu Hai He et al.: "Mesh model simplification algorithm based o shape transform of triangles", Journal of System Simulation, vol. 19, No. 19, pp. 4587-4590, Oct. 2007. Editorial Committee of the Journal of System Simulation.

Liu Huanmin et al: "A mesh simplification algorithm with area-weighted half edge collapse and progressive mesh construct", Journal of Wuhan University of Technology (Information & Management Engineering), vol. 29, No. 1, pp. 76-78, 82, Feb. 2005, Editorial Board J. Wuhan Univ. Technology.

Zhang Hui et al: "Mesh simplification based on shading characteristic", Journal of WSWCG, pp. 141-148, 2003, Univ. West Bohemia, Feb. 3-7, 2003.

Ito, Y., et al.: "Octree-based reasonable-quality hexahedral mesh generation using a new set of refinement templates", International Journal for Numerical Methods in Engineering, vol. 77, No. 13, pp. 1809-1833, Mar. 26, 2009, John Wiley & Sons Ltd.

* cited by examiner (a)

(b)

EFFICIENT COMPRESSION OF 3D MODELS BASED ON OCTREE DECOMPOSITION

This application claims the benefit, under 35 U.S.C. §365, of International Patent Application No. PCT/CN2012/070982 which was published in accordance with PCT Article 21 (2) on Aug. 15, 2013.

TECHNICAL FIELD

This invention relates to a method and an apparatus for generating a bitstream representative of a 3D model, and a method and an apparatus for decoding the same.

BACKGROUND 3D graphics data is widely used in multimedia applications such as video gaming, virtual reality, and scientific visualization. With rapid advances in digital acquisition technology, 3D models with millions of points are becoming increasingly common.

Traditional mesh representation of 3D objects requires both geometry and topology to be specified. By contrast, in point-based 3D model representation, processing and rendering are performed without the connectivity constraint and objects of complex topology can be more easily represented. Thus, point-based 3D model representation can be an ideal choice for 3D models with millions of points. With such a large amount of data, efficient compression of 3D models becomes very important.

SUMMARY

The present principles provide a method for generating or decoding a bitstream representing a 3D model, comprising the steps of: determining a surface smoothness measure for each one of a plurality of sub-cells of a cell in an octree, the octree being representative of the 3D model; and determining a traversal order of the sub-cells of the cell in response to the surface smoothness measures of the sub-cells as described below. The present principles also provide an apparatus for performing these steps.

The present principles also provide a method for generating or decoding a bitstream representing a 3D model, comprising the steps of: determining a surface smoothness measure for each one of a plurality of sub-cells of a cell in an octree, the octree being representative of the 3D model; and determining a traversal order of the sub-cells of the cell to be an ascending or descending order of the surface smoothness measures of the sub-cells, wherein the step of determining the surface smoothness measure comprises, for a particular sub-cell of the cell: forming a plurality of triangles in response to the particular sub-cell and neighboring cells of the cell, wherein each one of the triangles is defined by a point representative of the particular sub-cell and two points representative of two cells of the neighboring cells; determining an area for the each one of the triangles; and determining the surface smoothness measure for the particular sub-cell to be a sum of the areas of the plurality of triangles as described below. The present principles also provide an apparatus for performing these steps.

The present principles also provide a computer readable storage medium having stored thereon instructions for generating or decoding a bitstream according to the methods described above.

The present principles also provide a computer readable storage medium having stored thereon a bitstream generated according to the methods described above.

DETAILED DESCRIPTION 3D model compression may be performed based on octree-based partitioning of the object space. In an octree-based approach, a bounding box is initially constructed around all points of a 3D model. The bounding box of all 3D points is regarded as a single cell at the beginning. To build the octree, a cell is recursively subdivided into eight child cells (also denoted as sub-cells) until each non-empty cell is small enough to contain only one vertex or to enable a sufficiently precise reconstruction of the vertex position. Only the non-empty child cells will be subdivided further.

Figure 1A:
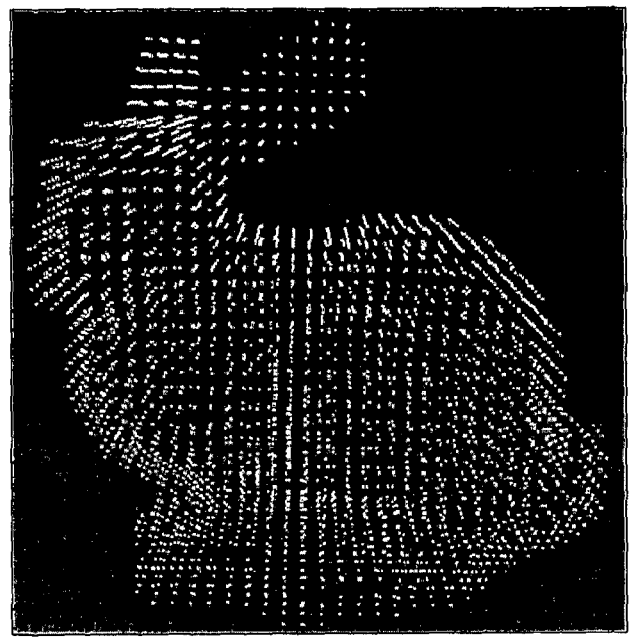
FIGS. 1A and 1B are pictorial examples depicting a point-based 3D model reconstructed at different levels of details (LODs), with more points in FIG. 1B than in FIG. 1A.
Figure 1B:
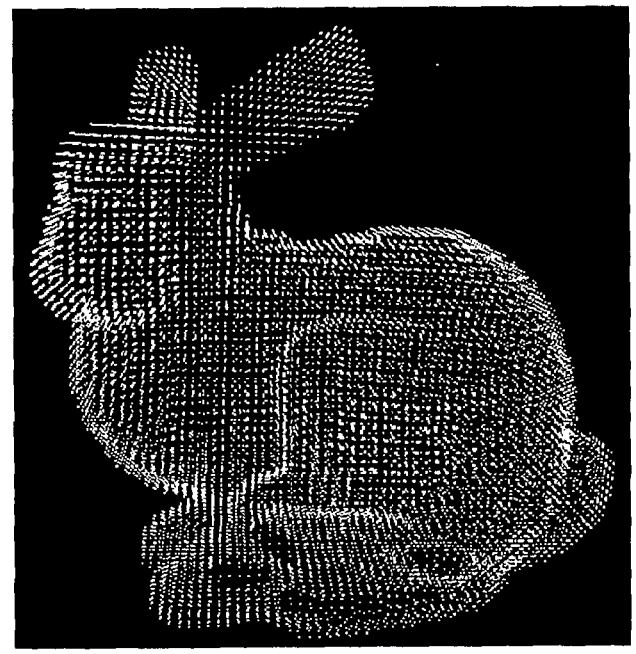

In the octree-based approach, the position of each cell is represented by the geometric center of the cell. The non-empty cells at each level in the octree structure yield an LOD (level of detail) of the original 3D model. As the 3D model can be restored at different LODs, the octree-based representation may achieve progressive compression of the 3D model. For example, FIGS. 1A and 1B illustrate a point-based 3D model reconstructed at different LODs, with more points in FIG. 1B than in FIG. 1A.

In the octree representation, a 1-bit flag may be used to indicate whether a child cell is non-empty, for example, with '1' indicating non-empty and '0' indicating empty. For each octree cell subdivision, if child cells are traversed according to a traversal order, an 8-bit string, denoted as an occupancy code, can be obtained. For example, the occupancy code is '11111111' (910) at the first level of an exemplary octree described in FIG. 9. When the 1-bit flag '1', the corresponding child cell can be further divided into 8 child cells and the subdivision can be represented by another occupancy code, for example, '11000000' (920) at the second level of the octree in FIG. 9. Note that the occupancy code depends on the traversal order.

Figure 2A:
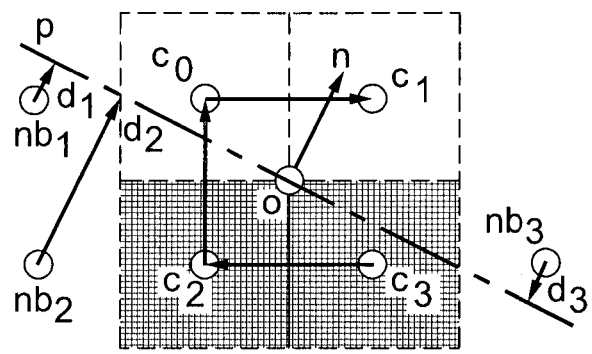
FIG. 2A is a pictorial example depicting child cell traversal order determination.
Figure 2B:
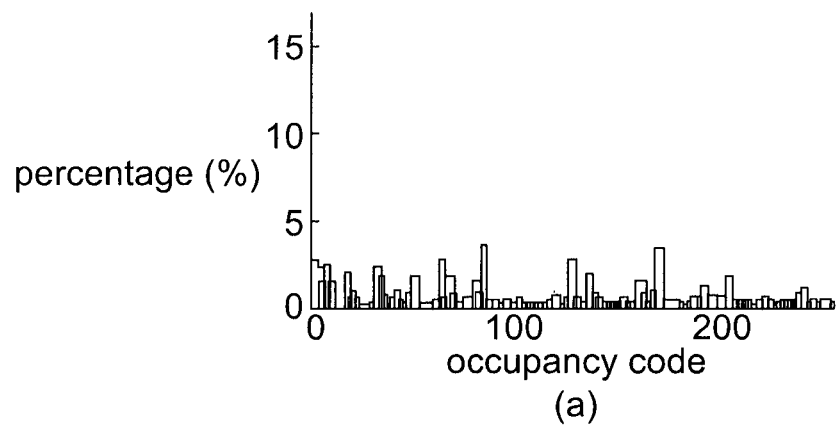
FIG. 2B is a pictorial example depicting histograms of occupancy codes before and after bit re-ordering.
Figure 2B:
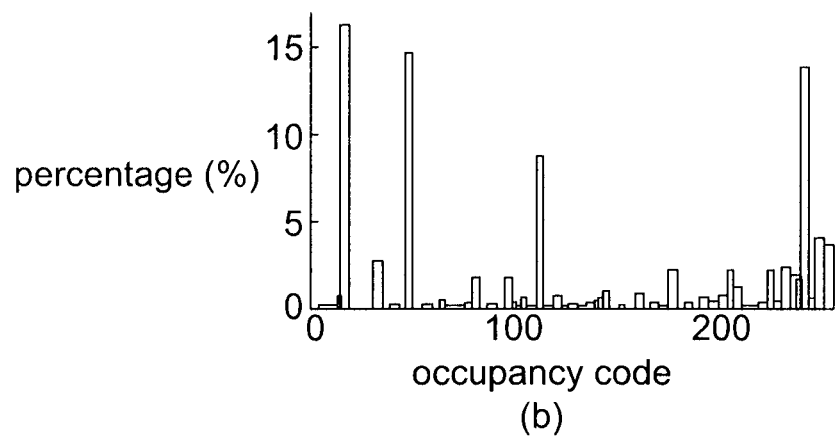

To reduce the entropy of occupancy codes and therefore improve compression efficiency, the bits in each occupancy code may be re-ordered. An existing method, which determines a child cell traversal order based on estimated relative probabilities and pushes the '1'-bits toward the end, is illustrated in FIG. 2A, where $C_0$, $C_1$, $C_2$, and $C_3$ are child cells, with $C_2$ and $C_3$ non-empty. The approximate tangent plane p is determined by the normal n at the parent representative o, and $nb_i$ is a neighbor representative whose distance to p is $d_i$ (i=1, 2, 3). The final order of child cell traversal is shown by arrows. Histograms of occupancy codes before and after bit re-ordering are described in FIG. 2B. As shown in FIG. 2B, high peaks show up at a few values after bit re-ordering, leading to a reduction of entropy.

The present principles provide a method and an apparatus for efficiently compressing 3D models represented by octree data structures. We observe that the surface in 3D models is usually very smooth. For example, the angles between the normals of two neighboring vertices are usually small. Based on the observed geometrical property, the present principles develop a surface smoothness measure and re-order the bits in an occupancy codes based on their surface smoothness measures.

Figure 3:
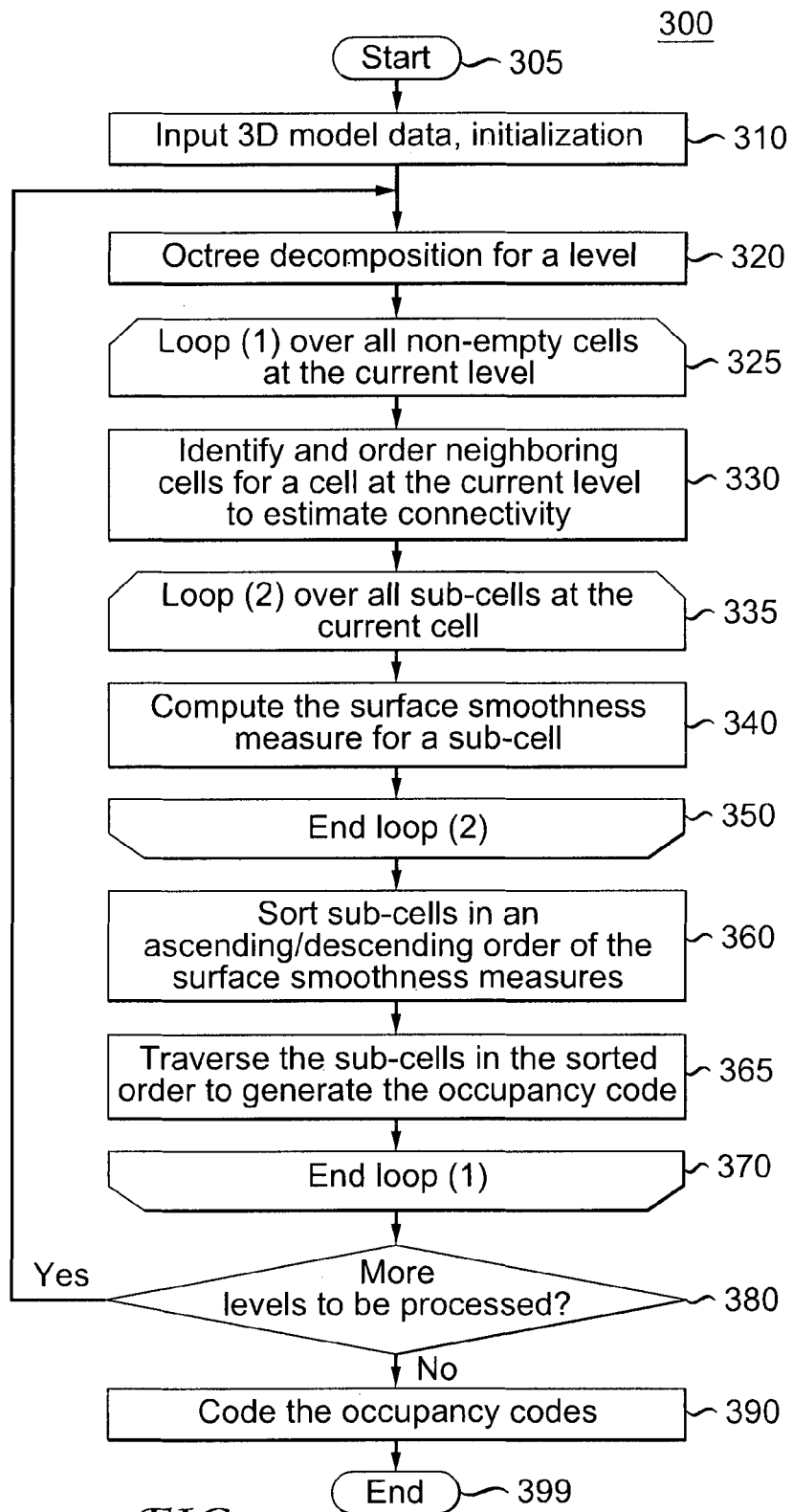
FIG. 3 is a flow diagram depicting an example for encoding 3D models, in accordance with an embodiment of the present principles.

FIG. 3 illustrates an exemplary method 300 for encoding a 3D model. Method 300 starts at step 305. At step 310, 3D model data is input and initialization is performed. For example, the initialization step may divide the 3D object into eight sub-cells and set a fixed traversal order. The same fixed traversal order would be used for decoding the first level.

Method 300 may proceed level by level. At step 320, the 3D object is further divided to form a new level of the octree. For each non-empty cell at a current level, an occupancy code needs to be generated.

A loop (1) starts at step 325 to loop over each non-empty cell at the current level. For a particular non-empty cell in the current level, its neighboring cells are identified and ordered at step 330 to estimate connectivity. When the connectivity information is available, for example, when a 3D mesh model is provided, this step can be skipped. For the particular cell, a loop (2) starts at step 335 to loop over all its sub-cells. For each sub-cell in the particular cell, a surface smoothness measure can be computed at step 340. The loop (2) ends at step 350. A traversal order may be determined at step 360 to be a pre-determined order, for example, an ascending order or a descending order, of the surface smoothness measures of the sub-cells.

At step 365, an occupancy code is generated for the current cell based on the traversal order. The loop (1) ends at step 370. At step 380, it checks whether the 3D object needs to be further divided. If it needs to, the control returns to step 320. Otherwise, at step 390, the occupancy codes generated for the 3D model are encoded, for example, using an entropy encoder. Method 300 ends at step 399.

At lower levels (for example, levels 0 to 6) of an octree, the 3D representation is coarser because fewer points are available. A smoothing step may be performed after each lower level is processed (370). Existing methods may be used for smoothing, for example, all points are replaced by a smoothed version defined as their projections onto a plane.

In loop (1) where all non-empty cells in a current level are processed, the cells in the current levels may be processed in a breadth-first traversal of the octree. To further improve compression performance, those cells that introduce the greatest error may be processed earlier. This may not only lead to a faster increase of the signal to noise ratio (SNR) during decoding, but may also improve the overall compression performance. In an existing method, to estimate which cells introduce the greatest errors, the number of neighboring cells connecting to the current cell is used. In particular, the higher the number of neighboring cells is, the earlier the cell is processed. Note that the same order should be used at the encoder and decoder to process the cells at one level.

In the following, the step of identifying and ordering neighboring cells (330) and the step of computing the surface smoothness measure (340) are described in further detail.

Identifying and Ordering Neighboring Cells

Figure 4:
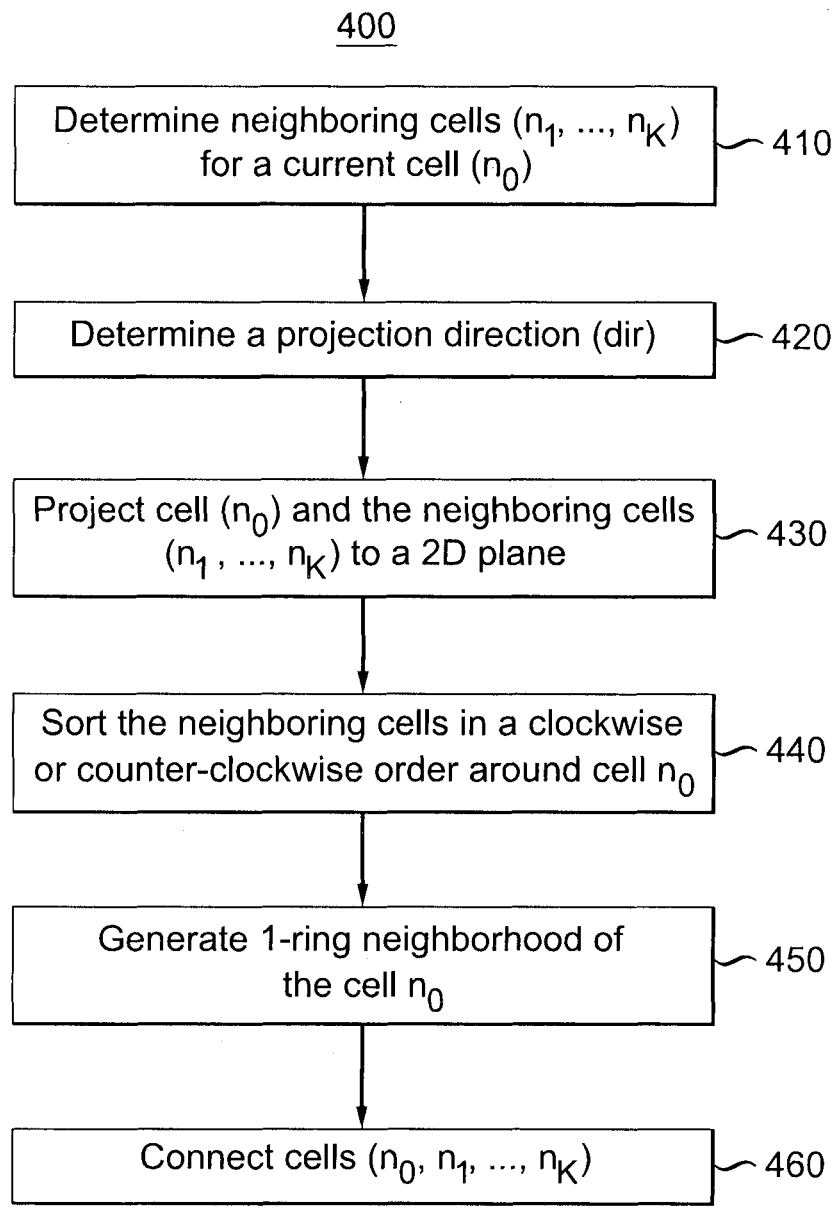
FIG. 4 is a flow diagram depicting an example for identifying and ordering neighboring cells to estimate connectivity, in accordance with an embodiment of the present principles.

In a 3D mesh model, an edge indicates the neighbor relationship between two vertices. In a point-based 3D model, there are no edges and the "neighbor" relationship needs to be estimated based on the geometrical property. FIG. 4 illustrates an exemplary method 400 for identifying and ordering neighboring cells to estimate connectivity for a current cell. Method 400 can be used to perform step 330 in method 300.

At each level of the octree, a k-d tree may be built for all the points at the current level. For a cell $n_0$, its K neighbors may be identified at step 410. For example, the cells nearest to $n_0$ or the cells whose distances to $n_0$ are smaller than a threshold may be identified as neighboring cells. The value of K may vary with applications. In one exemplary embodiment, K=4 or 5.

To identify the connectivity information, the K neighbors may be projected to a 2D plane. At step 420, a projection direction dir is chosen, and at step 430, cell $n_0$ and the K neighboring cells are projected to a 2D plane according to the project direction dir.

Figure 5:
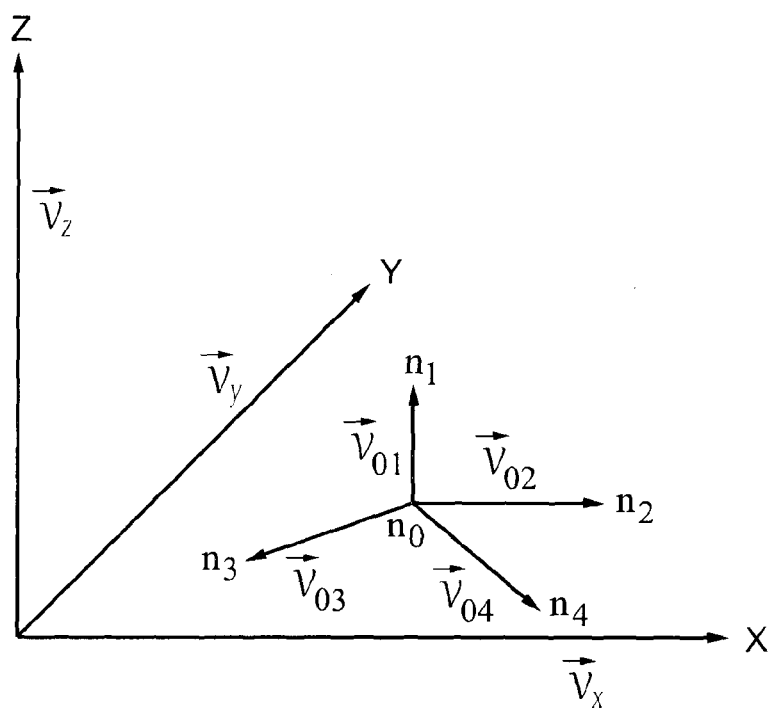
FIG. 5 is a pictorial example depicting coordinate axes and vectors that are used to determine the projection direction for a current cell $n_0$ and its neighboring cells $n_1$, $n_2$, $n_3$, and $n_4$, in accordance with an embodiment of the present principles.

To choose the projection direction, the coordinate axes (i.e., X-axis, Y-axis, or Z-axis) are denoted as vectors $\vec{v}_x$, $\vec{v}_Y$ and $\vec{v}_Z$, and a line connecting cell $n_0$ and a neighboring cell $n_i$ (i=1, K) is denoted as $\vec{v}_{0i}$, as shown in FIG. 5. Firstly, the absolute value of the dot product between an axis and $v_{0i}$, is computed. For each axis, the maximum value of the dot products may be found and denoted as $V_X$ for X-axis, $V_Y$ for Y-axis, or $V_Z$ for Z-axis. Mathematically, the computation can be formulated as $$V_X = \max \langle \vec{v}_x, \vec{v}_{0i} \rangle, V_Y = \max \langle \vec{v}_Y, \vec{v}_{0i} \rangle, V_Z = \max \langle \vec{v}_Z, \vec{v}_{0i} \rangle, i=1, \ldots, K. \quad (1)$$

Then the axis corresponding to the minimum of $V_X$, $V_Y$, and $V_Z$ is selected as the projection direction dir. Such a projection direction ensures that the points are more spread out in the projection plane and guarantees numerical robustness. Note that since the project direction is decided locally for a cell, it may vary from cell to cell.

After obtaining the projection direction, the current cell $n_0$ and its neighboring cells $n_i$ (i=1, ..., K) may be projected to a 2D plane. The projected neighboring cells may then be sorted in a clockwise or counter-clockwise order around cell $n_0$ at step 440. Subsequently, a 1-ring neighborhood of the current cell $n_0$ is generated at step 450 and the connectivity is identified at step 460.

Neighbor identification and ordering is a feature of the present principles. To improve the performance, with the subdivision of cells going on at a level, the neighboring cells could be updated by finer representation. In one embodiment, when a neighboring cell at the same level has been subdivided, the newly generated child cells can be used to update the neighbor relationship. In another embodiment, when a neighboring cell is not subdivided yet, existing methods may be used to estimate which sub-cells may be non-empty, and the estimated non-empty sub-cells can be used to update the neighbor relationship.

Figure 6:
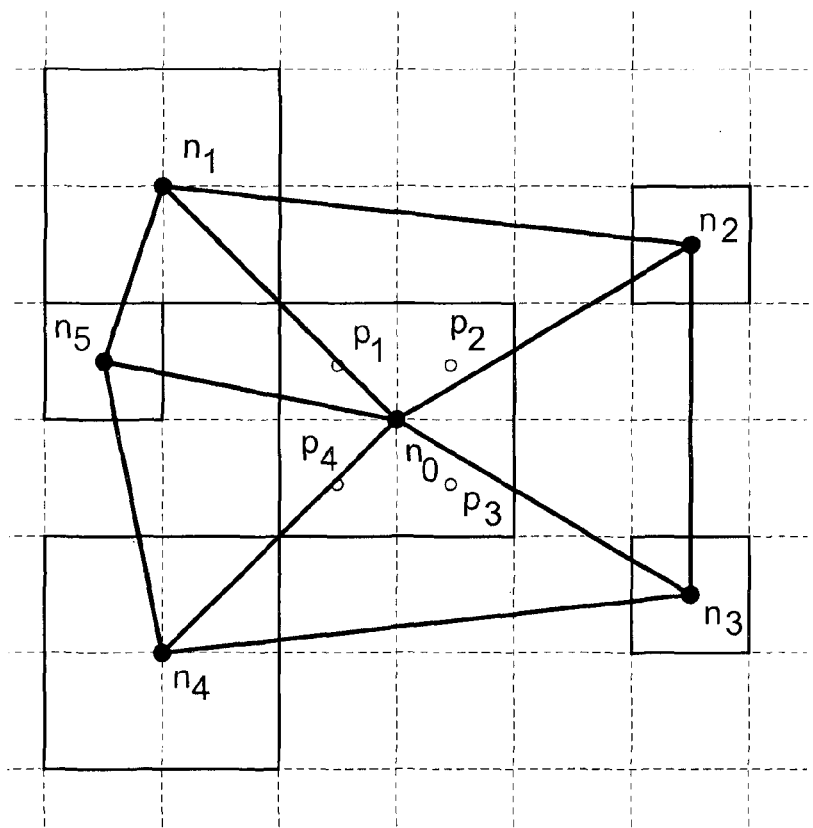
FIG. 6 is a pictorial example depicting sub-cells $p_1$, $p_2$, $p_3$, and $p_4$ of cell $n_0$, and a 1-ring neighborhood of cell $n_0$, in accordance with an embodiment of the present principles.

FIG. 6 illustrates an example of estimating connectivity. In this example, neighboring cells are sorted as $n_1, n_2, n_3, n_4, n_5$, and $n_1$, using a clockwise order. Subsequently, edges are added to indicate connectivity between the following pairs of cells: $n_1n_2, n_2n_3, n_3n_4, n_4n_5, n_5n_1, n_1n_0, n_2n_0, n_3n_0, n_4n_0, n_5n_0$. That is, the current cell is connected to each of the identified neighboring cells, and two neighboring cells adjacent to each other in the sorted order are connected. Consequently, a 1-ring neighborhood of the current cell $n_0$ is formed and the connectivity is identified after sorting neighboring cells and adding edges. That is, a local mesh is generated for the current cell and its neighboring cells.

Different from the connectivity information that already exists in the input 3D mesh model, the connectivity needs to be estimated from the input 3D point-based model, for example, using the method described above. Such estimated connectivity information in the point-based model may be referred to as "virtual" connectivity since it does not exist in the input 3D model.

Computing the Surface Smoothness Measure

In the present principles, the connectivity information is used to generate surface smoothness measures, which can be used for determining the traversal order of the sub-cells in a cell.

In one embodiment, the surface smoothness measure may be defined as the sum of triangle areas, wherein the triangles are defined by a sub-cell and neighboring cells. Assuming a sub-cell of the current cell is denoted as $p_j$, j=1, ..., 8, the surface smoothness measure for sub-cell $p_j$ may be defined as $$\text{measure}_{area,j} = S(\Delta p_j n_1 n_2) + S(\Delta p_j n_2 n_3) + \ldots + S(\Delta p_n n_{K-1} n_K) + S(\Delta p_j n_K n_1), \quad (2)$$

where $S(\Delta p_j n_x n_y)$ (x,y=1, K) represents the area of triangle $\Delta p_j n_x n_y$. That is, triangle $\Delta p_j n_x n_y$ is formed using sub-cell $p_j$ and two neighboring cells, where the two neighboring cells are connected or "virtually" connected (i.e., adjacent to each other in the sorted order).

In another embodiment, the surface smoothness measure may be defined as the sum of angular measures, wherein the angles are defined by a sub-cell and neighboring cells. For sub-cell $p_j$, j=1, ..., 8, the surface smoothness measure may be defined as $$\text{measure}_{angle,j} = 2\pi - [\theta(\angle n_1 p_j n_2) + \theta(\angle n_2 p_j n_3) + \ldots + \theta(\angle n_{K-1} p_j n_K) + \theta(\angle n_K p_j n_1)]. \quad (3)$$

That is, angle $\angle n_x p_j n_y$ (x, y=1, ..., K) is formed using sub-cell $p_j$ and two connected neighboring cells, and its angular measure $\theta(\angle n_x p_j n_y)$ (radian) is used to compute the surface smoothness measure.

Using FIG. 6 as an example of a 2D representation of 3D points, the surface smoothness measure using triangle areas can be computed as:

$$\text{measure}_{area,j} = S(\Delta p_j n_1 n_2) + S(\Delta p_j n_2 n_3) + S(\Delta p_j n_3 n_4) + S(\Delta p_j n_4 n_5) + S(\Delta p_j n_5 n_1), j=1, \ldots, 4,$$

and the surface smoothness measure using angular measures can be computed as:

$$\text{measure}_{angle,j} = 2\pi - [\theta(\angle n_1 p_j n_2) + \theta(\angle n_2 p_j n_3) + \theta(\angle n_3 p_j n_4) + \theta(\angle n_4 p_j n_5) + \theta(\angle n_5 p_j n_1)].$$

Both $\text{measure}_{area,j}$ and $\text{measure}_{angle,j}$ measure the local smoothness of the surface of 3D objects and may be used at step 340. When $\text{measure}_{area,i}$ or $\text{measure}_{angle,i}$ gets smaller, the flatter and smoother the surface appears. Based on the observation that the surface of 3D objects is usually smooth, the smaller $\text{measure}_{area,j}$ or $\text{measure}_{angle,j}$ is, the more likely the corresponding sub-cell is non-empty.

Figure 7:
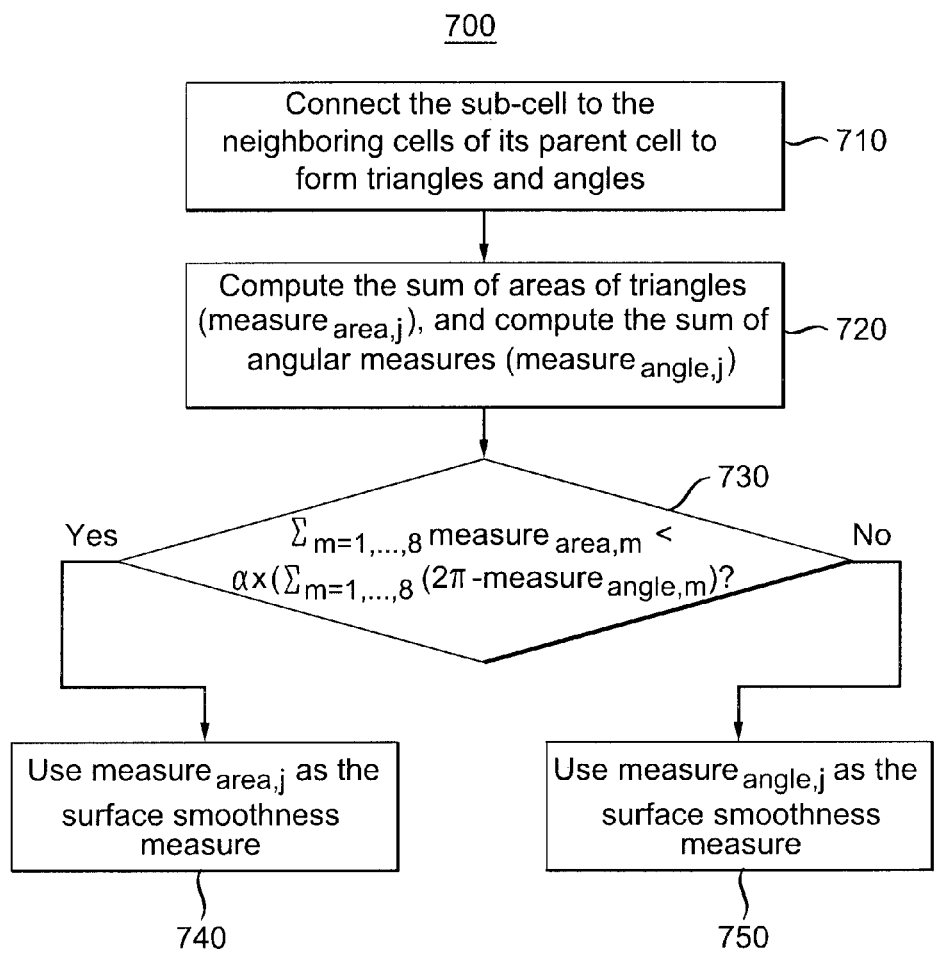
FIG. 7 is a flow diagram depicting an example for computing the surface smoothness measure for sub-cells in a cell, in accordance with an embodiment of the present principles.

FIG. 7 illustrates another exemplary method 700, which may also be used at step 340, for computing the surface smoothness measure. In method 700, the surface smoothness measure is adaptively selected between $\text{measure}_{area,j}$ and $\text{measure}_{angle,j}$. Generally, the larger the surface smoothness measure is, the more robust the numerical performance is. At step 710, sub-cells are connected to the neighboring cells to form triangles and angles. Then $\text{measure}_{area,j}$ and $\text{measure}_{angle,j}$ are computed for each sub-cell. At step 730, it checks whether $\Sigma_{m=1,\ldots,8}\text{measure}_{area,m} < (\Sigma_{m=1,\ldots,8}(2\sigma - \text{measure}_{angle,m}))$ at step 730, where $\alpha$ is a scaling factor. In one example, $\alpha=10$. If the inequality at step 730 holds, $\text{measure}_{area,j}$ is selected at step 740. Otherwise, $\text{measure}_{angle,j}$ is selected at step 750.

Mathematically, the selection can be denoted as the follows:

$$\text{measure}_j = \begin{cases} \text{measure}_{area,j}, & \sum_{m=1,\ldots,8} \text{measure}_{area,m} < \alpha \times \\ & \sum_{m=1,\ldots,8}(2\pi - \text{measure}_{angle,m}) \\ \text{measure}_{angle,j}, & \text{otherwise} \end{cases} \quad (4)$$

To simplify the computation, we may compare only the measures for any single sub-cell, that is $$\text{measure}_j = \begin{cases} \text{measure}_{area,j}, & \text{measure}_{area,m} < \alpha \times \\ & (2\pi - \text{measure}_{angle,m}) \\ & m = 1, \ldots, 8 \\ \text{measure}_{angle,j}, & \text{otherwise} \end{cases} \quad (5)$$

In our experiments, we observe that $\text{measure}_{area,j}$ is selected much more often than $\text{measure}_{angle,j}$.

After the surface smoothness measures are calculated for individual sub-cells in a cell, the traversal order of the eight child cells may be determined. In one embodiment, the traversal order may be determined to be an ascending order of the surface smoothness measures. As discussed before, when the surface smoothness measure is small, the corresponding sub-cells are more likely to be non-empty. Thus, re-ordering the sub-cells in the ascending order tends to push the non-empty sub-cells to the beginning. Consequently, '1'-bits in the generated occupancy codes tend to occur at the beginning. In another embodiment, the traversal order may be determined to be a descending order of the surface smoothness measures, and '1'-bits in the generated occupancy codes tend to occur at the end.

In a more general embodiment, the traversal order may be determined as a pre-determined order of the surface smoothness measures, where the same pre-determined order should be known at the encoder and decoder. By organizing the bits in the occupancy codes based on the geometrical property of the corresponding sub-cells, the present principles may achieve great entropy reduction and hence provide higher compression efficiency.

Figure 8:
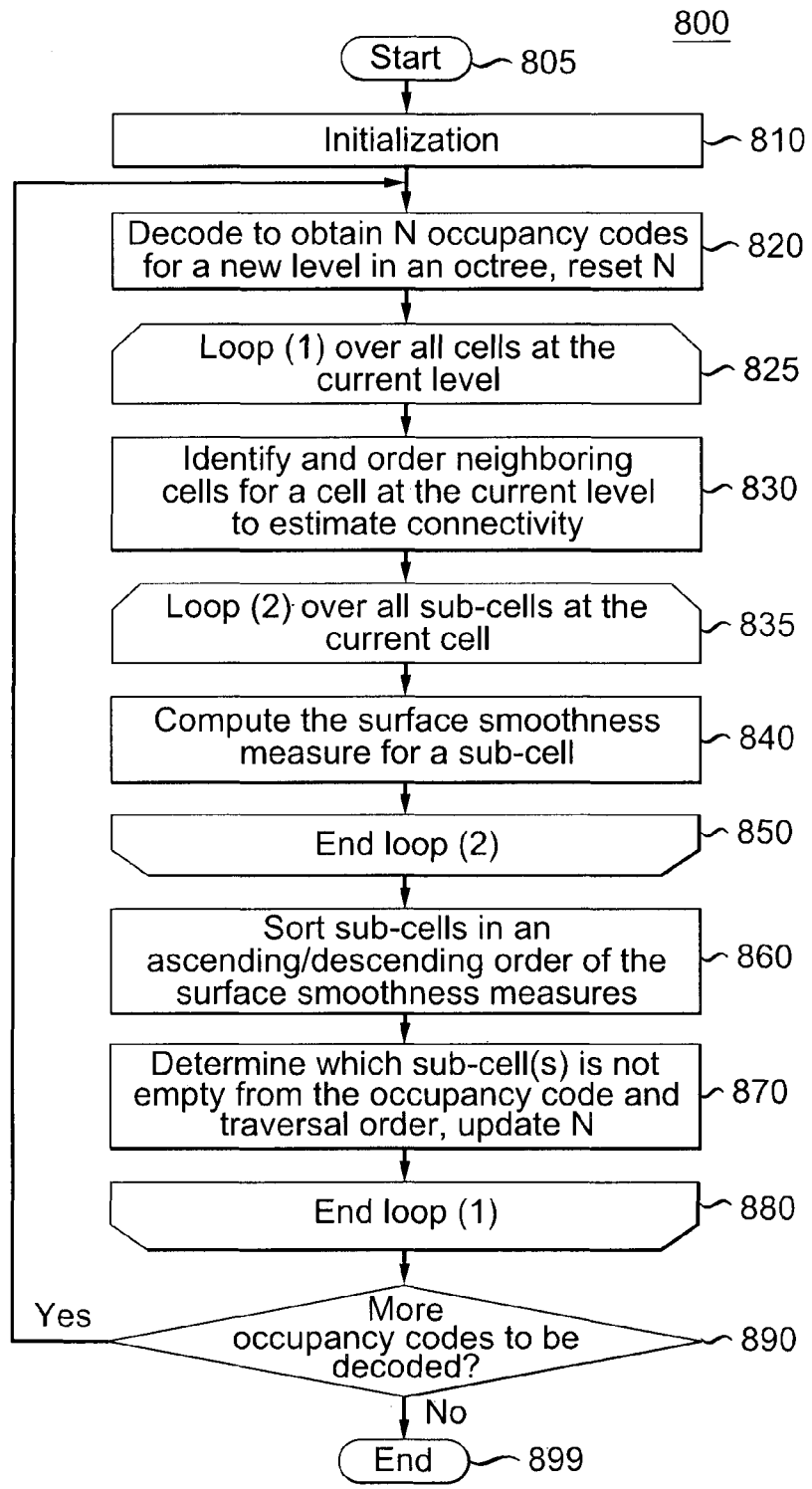
FIG. 8 is a flow diagram depicting an example for decoding 3D models, in accordance with an embodiment of the present principles.

FIG. 8 illustrates an exemplary method 800 for decoding a bitstream representing a 3D model, for example, a bitstream generated using method 300. Method 800 starts at step 805 and performs initialization at step 810. For example, the initialization step may read one occupancy code for the first level, set the traversal order for the first level to be a fixed order decided by the encoder, and set N to be the number of '1'-bits in the root occupancy code. At step 820, the bitstream is decoded to obtain N occupancy codes for a new level and the value of N is reset to zero.

For each cell, the traversal order of sub-cells needs to be determined so that whether a sub-cell is non-empty can be determined from the traversal order and the occupancy code.

To determine the traversal order, a loop (1) starts at step 825 to loop over each non-empty cell in the current level. For a particular non-empty cell in the current level, the neighboring cells are identified and ordered at step 830 to estimate connectivity. Similarly to encoding method 300, when the connectivity information is available, step 830 can be skipped. For the particular cell, a loop (2) starts at step 835 to loop over all its sub-cells. For each sub-cell in the particular cell, a surface smoothness measure can be computed at step 840. The loop (2) ends at step 850. A traversal order may be determined at step 860 by sorting the surface smoothness measures of the sub-cells. How the surface smoothness measures are sorted should be consistent with what is used for encoding.

Note that to precisely decide whether a sub-cell is non-empty, the same method used to generate the bitstream should be used to determine the traversal order. That is, steps 830, 840, and 860 should be consistent with steps 330, 340, and 360, respectively.

At step 870, whether a sub-cell is non-empty is decided by the occupancy code and the traversal order for the current cell. For each occupancy code, its number of '1'-bits is used to increment the value of N. The loop (1) ends at step 880. At step 890, it checks whether more occupancy codes need to be decoded. If more decoding is needed, the control returns to step 820. Otherwise, it ends at step 899.

Figure 9:
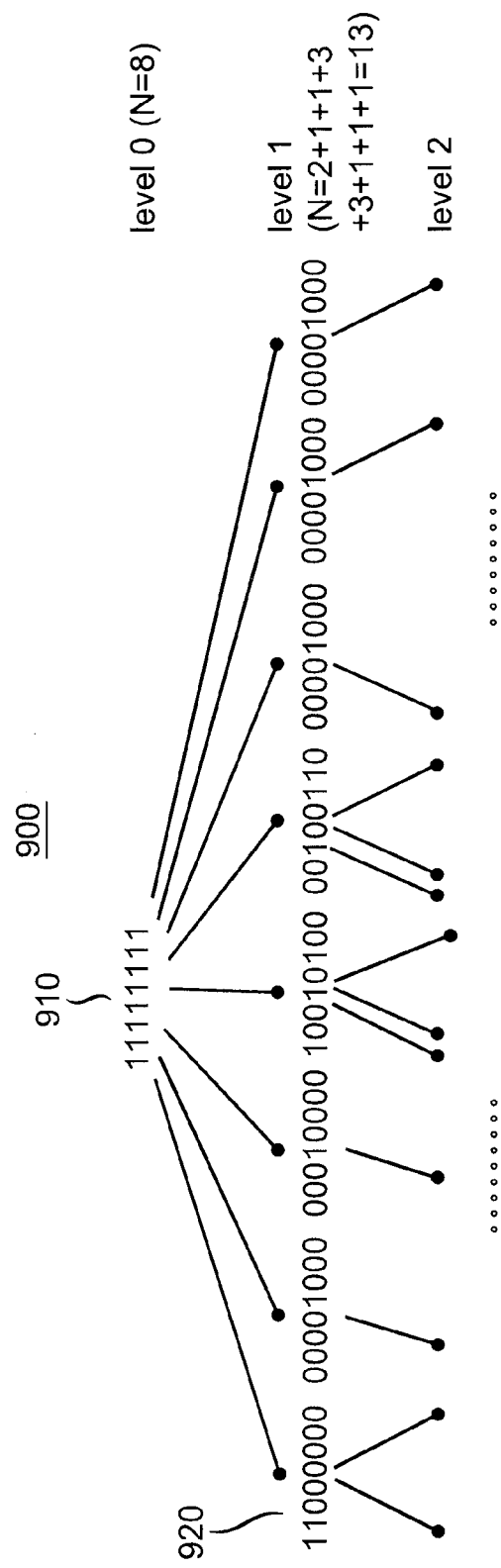
FIG. 9 is a pictorial example depicting how to calculate the number of non-empty cells in the next level in an octree, in accordance with an embodiment of the present principles.

FIG. 9 illustrates an example for updating N. At first level (level 0), the occupancy code is '11111111' and N is set to 8. In general, for a practical 3D model with many points, all sub-cells of the initial cell 910 are non-empty, and thus the occupancy code is '11111111'. For the subsequent level (level 1), each occupancy code is processed and N is updated. In this example, the first cell 920 at level 1 is '11000000', which has two '1'-bits (i.e., two non-empty child cells), and N is incremented by 2. After all cells at level 1 are processed, N becomes 13. Consequently, 13 occupancy codes can be decoded for next level (level 2), and each of the 13 occupancy codes correspond to a non-empty sub-cell of level 1.

Figure 10:
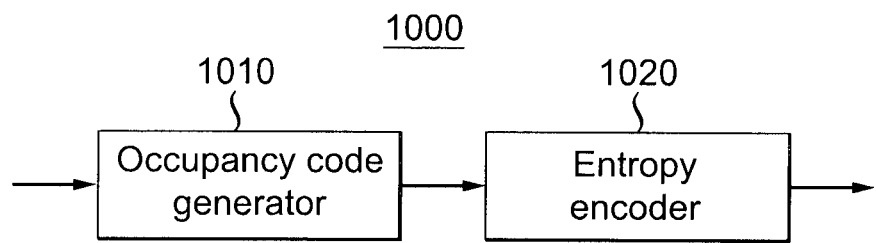
FIG. 10 is a block diagram depicting an exemplary encoder, in accordance with an embodiment of the present principles.

FIG. 10 depicts an exemplary encoder 1000, which can be used to generate a bitstream as described method 300. The input of encoder 1000 includes the 3D model data, for example, a point-based 3D model or a 3D mesh model. The input may also include metadata, for example, metadata to indicate whether a descending or ascending order is used to sort the surface smoothness measures, and the values of K and α. The metadata may be known to both the encoder and decoder, or they may be embedded in the bitstream. An occupancy code generator 1010 generates occupancy codes for the 3D model data. The occupancy codes may then be compressed by an entropy encoder 1020.

Figure 11:
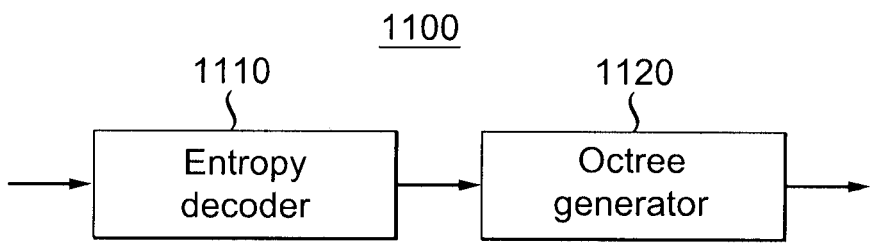
FIG. 11 is a block diagram depicting an exemplary decoder, in accordance with an embodiment of the present principles.

FIG. 11 depicts an exemplary decoder 1100, which can be used to decode a bitstream as described in method 800. An entropy decoder 1110 is used to decompress the occupancy codes. Using the occupancy codes, an octree generator 1120 determines which sub-cells are non-empty and reconstructs the octree.

Figure 12:
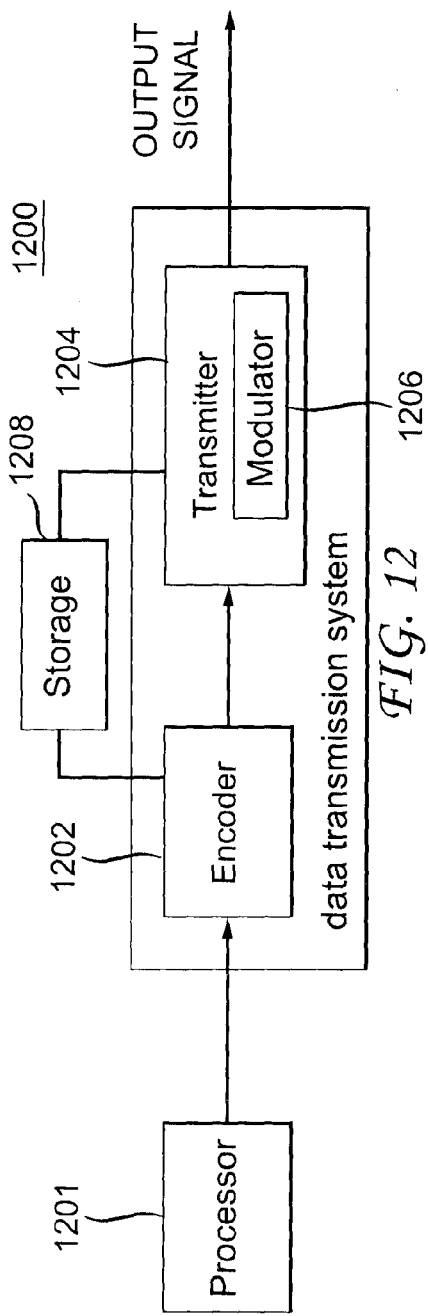
FIG. 12 is a block diagram depicting an example of a data processing system that may be used with one or more implementations of the present principles.

Referring to FIG. 12, a data transmission system 1200 is shown, to which the features and principles described above may be applied. The data transmission system 1200 may be, for example, a head-end or transmission system for transmitting a signal using any of a variety of media, such as, satellite, cable, telephone-line, or terrestrial broadcast. The data transmission system 1200 also may be used to provide a signal for storage. The transmission may be provided over the Internet or some other network. The data transmission system 1200 is capable of generating and delivering, for example, video content and other content such as point-based 3D models and 3D mesh models.

The data transmission system 1200 receives processed data and other information from a processor 1201. In one implementation, the processor 1201 generates 3D models. The processor 1201 may also provide metadata to 1200 indicating, for example, how many levels of the octree should be compressed or which sorting order should be used for the surface smoothness measure or the values of constants.

The data transmission system or apparatus 1200 includes an encoder 1202 and a transmitter 1204 capable of transmitting the encoded signal. The encoder 1202 receives data information from the processor 1201. The encoder 1202 generates an encoded signal(s). The entropy encoding engine of encoder 1202 may be, for example, arithmetic coding or Huffman coding. Then encoder 1202 may be, for example, encoder 1000 as described in FIG. 10.

The encoder 1202 may include sub-modules, including for example an assembly unit for receiving and assembling various pieces of information into a structured format for storage or transmission. The various pieces of information may include, for example, coded or uncoded video, and coded or uncoded elements. In some implementations, the encoder 1202 includes the processor 1201 and therefore performs the operations of the processor 1201.

The transmitter 1204 receives the encoded signal(s) from the encoder 1202 and transmits the encoded signal(s) in one or more output signals. The transmitter 1204 may be, for example, adapted to transmit a program signal having one or more bitstreams representing encoded pictures and/or information related thereto. Typical transmitters perform functions such as, for example, one or more of providing error-correction coding, interleaving the data in the signal, randomizing the energy in the signal, and modulating the signal onto one or more carriers using a modulator 1206. The transmitter 1204 may include, or interface with, an antenna (not shown). Further, implementations of the transmitter 1204 may be limited to the modulator 1206.

The data transmission system 1200 is also communicatively coupled to a storage unit 1208. In one implementation, the storage unit 1208 is coupled to the encoder 1202, and stores an encoded bitstream from the encoder 1202. In another implementation, the storage unit 1208 is coupled to the transmitter 1204, and stores a bitstream from the transmitter 1204. The bitstream from the transmitter 1204 may include, for example, one or more encoded bitstreams that have been further processed by the transmitter 1204. The storage unit 1208 is, in different implementations, one or more of a standard DVD, a Blu-Ray disc, a hard drive, or some other storage device.

Figure 13:
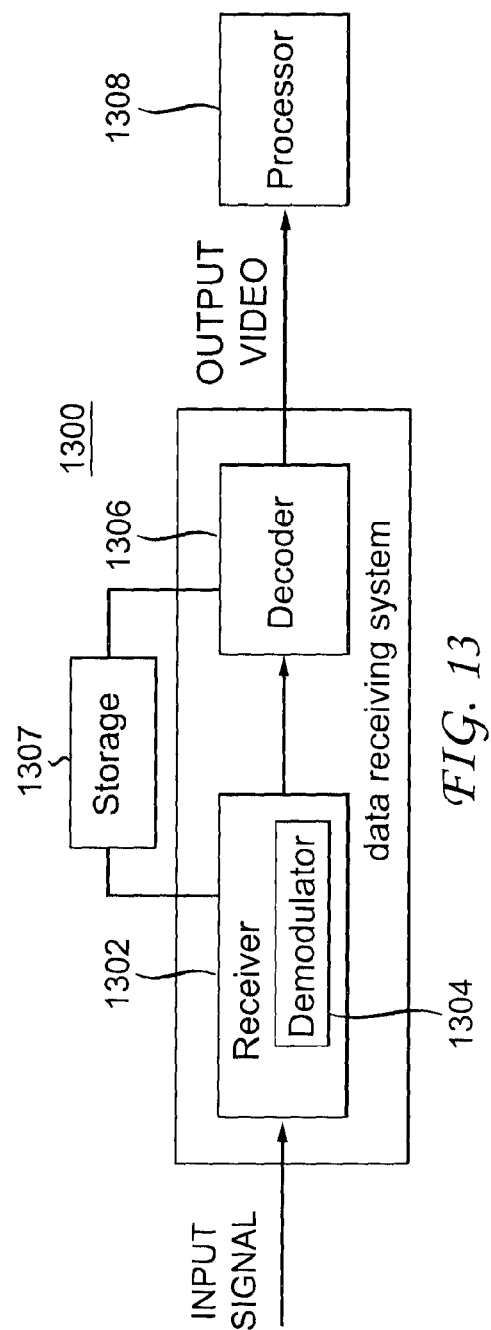
FIG. 13 is a block diagram depicting another example of a data processing system that may be used with one or more implementations of the present principles.

Referring to FIG. 13, a data receiving system 1300 is shown to which the features and principles described above may be applied. The data receiving system 1300 may be configured to receive signals over a variety of media, such as storage device, satellite, cable, telephone-line, or terrestrial broadcast. The signals may be received over the Internet or some other network.

The data receiving system 1300 may be, for example, a cell-phone, a computer, a set-top box, a television, or other device that receives encoded video and provides, for example, decoded video signal for display (display to a user, for example), for processing, or for storage. Thus, the data receiving system 1300 may provide its output to, for example, a screen of a television, a computer monitor, a computer (for storage, processing, or display), or some other storage, processing, or display device.

The data receiving system 1300 is capable of receiving and processing data information, and the data information may include, for example, 3D models. The data receiving system or apparatus 1300 includes a receiver 1302 for receiving an encoded signal, such as, for example, the signals described in the implementations of this application. The receiver 1302 may receive, for example, a signal providing one or more of the 3D models, or a signal output from the data transmission system 1200 of FIG. 12.

The receiver 1302 may be, for example, adapted to receive a program signal having a plurality of bitstreams representing encoded pictures or 3D models. Typical receivers perform functions such as, for example, one or more of receiving a modulated and encoded data signal, demodulating the data signal from one or more carriers using a demodulator 1304, de-randomizing the energy in the signal, de-interleaving the data in the signal, and error-correction decoding the signal. The receiver 1302 may include, or interface with, an antenna (not shown). Implementations of the receiver 1302 may be limited to the demodulator 1304.

The data receiving system 1300 includes a decoder 1306. The receiver 1302 provides a received signal to the decoder 1306. The signal provided to the decoder 1306 by the receiver 1302 may include one or more encoded bitstreams. The decoder 1306 outputs a decoded signal, such as, for example, decoded video signals including video information or 3D models. The decoder 1306 may be, for example, decoder 1100 described in FIG. 11.

The data receiving system or apparatus 1300 is also communicatively coupled to a storage unit 1307. In one implementation, the storage unit 1307 is coupled to the receiver 1302, and the receiver 1302 accesses a bitstream from the storage unit 1307. In another implementation, the storage unit 1307 is coupled to the decoder 1306, and the decoder 1306 accesses a bitstream from the storage unit 1307. The bitstream accessed from the storage unit 1307 includes, in different implementations, one or more encoded bitstreams. The storage unit 1307 is, in different implementations, one or more of a standard DVD, a Blu-Ray disc, a hard drive, or some other storage device.

The output data from the decoder 1306 is provided, in one implementation, to a processor 1308. The processor 1308 is, in one implementation, a processor configured for performing 3D model reconstruction. In some implementations, the decoder 1306 includes the processor 1308 and therefore performs the operations of the processor 1308. In other implementations, the processor 1308 is part of a downstream device such as, for example, a set-top box or a television.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, processing the information, transmitting the information, moving the information, copying the information, erasing the information, calculating the information, determining the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for generating or decoding a bitstream representing a 3D model, comprising:
   determining a surface smoothness measure for each one of a plurality of sub-cells of a cell in an octree, the octree being representative of the 3D model, wherein the determining the surface smoothness measure comprises, for a particular sub-cell of the cell:
      forming a plurality of triangles in response to the particular sub-cell and neighboring cells of the cell, wherein each one of the triangles is defined by a point representative of the particular sub-cell and two points representative of two cells of the neighboring cells,
      determining an area for the each one of the triangles, and
      determining the surface smoothness measure for the particular sub-cell in response to the areas of the plurality of triangles; and
   determining a traversal order of the sub-cells of the cell in response to the surface smoothness measures of the sub-cells.

2. The method of claim 1, wherein the traversal order corresponds to an ascending or descending order of the surface smoothness measures.

3. The method of claim 1, wherein the surface smoothness measure is determined to be a sum of the areas.

4. The method of claim 1, wherein the determining the surface smoothness measure further comprises, for the particular sub-cell of the cell:
   forming a plurality of angles in response to the particular sub-cell and neighboring cells of the cell, wherein each one of the angles is defined by a point representative of the particular sub-cell and two points representative of two cells of the neighboring cells, the point representative of the particular sub-cell corresponding to a vertex of the each one of the angles;
   determining an angular measure for the each one of the angles; and
   determining the surface smoothness measure for the particular sub-cell in response to the angular measures of the plurality of angles.

5. The method of claim 4, wherein the surface smoothness measure is determined to be a sum of the angular measures.

6. The method of claim 1, further comprising:
   determining a plurality of cells as the neighboring cells;
   determining a sorted order of the neighboring cells, wherein the two cells of the neighboring cells are adjacent to each other in the sorted order; and
   connecting the two cells of the neighboring cells.

7. The method of claim 6, wherein the determining the sorted order comprises:
   determining a projection direction in response to the cell and the neighboring cells;
   projecting the cell and the neighboring cells to a 2D plane; and
   sorting the neighboring cells in a counter-clockwise or a clockwise order around the cell in the 2D plane.

8. The method of claim 7, wherein the determining the projection direction comprises:
   forming a plurality of vectors, each one of the plurality of vectors is defined by the cell and one cell of the neighboring cells;
   determining a set of absolute inner products for each axis of three coordinate axes, wherein each absolute inner product in the set of absolute inner products is formed between a vector representative of a corresponding coordinate axis and a respective one vector of the plurality of vectors;
   determining a minimum absolute inner product for the set of absolute inner products; and
   determining a coordinate axis as the projection direction, wherein the coordinate axis corresponds to a maximum of the three minimum absolute inner products for the three sets of absolute inner products.

9. The method of claim 1, further comprising:
   determining a bit for the each one of the sub-cells, wherein the bit indicates whether a corresponding sub-cell is empty;
   forming a bit string using the determined bits for the sub-cells in response to the traversal order; and
   entropy coding the bit string into the bitstream.

10. The method of claim 1, further comprising:
    decoding a bit string from the bitstream; and
    determining a bit for a corresponding sub-cell in response to the traversal order, wherein the bit indicates whether the corresponding sub-cell is empty.

11. An apparatus for generating or decoding a bitstream representing a 3D model, comprising at least one memory and one or more processors, the one or more processors being configured to:
    determine a surface smoothness measure for each one of a plurality of sub-cells of a cell in an octree, the octree being representative of the 3D model, wherein the one or more processors are configured to, for a particular sub-cell of the cell:
       form a plurality of triangles in response to the particular sub-cell and neighboring cells of the cell, wherein each one of the triangles is defined by a point representative of the particular sub-cell and two points representative of two cells of the neighboring cells,
       determine an area for the each one of the triangles, and
       determine the surface smoothness measure for the particular sub-cell in response to the areas of the plurality of triangles; and
    determine a traversal order of the sub-cells of the cell in response to the surface smoothness measures of the sub-cells.

12. The apparatus of claim 11, wherein the traversal order corresponds to an ascending or descending order of the surface smoothness measures.

13. The apparatus of claim 11, wherein the surface smoothness measure is determined to be a sum of the areas.

14. The apparatus of claim 11, wherein the one or more processors are configured to, for the particular sub-cell of the cell:
    form a plurality of angles in response to the particular sub-cell and neighboring cells of the cell, wherein each one of the angles is defined by a point representative of the particular sub-cell and two points representative of two cells of the neighboring cells, the point representative of the particular sub-cell corresponding to a vertex of the each one of the angles;

determine an angular measure for the each one of the angles; and determine the surface smoothness measure for the particular sub-cell in response to the angular measures of the plurality of angles.

15. The apparatus of claim 14, wherein the surface smoothness measure is determined to be a sum of the angular measures.

16. The apparatus of claim 11, wherein the one or more processors are configured to:

determine a projection direction in response to the cell and the neighboring cells;

project the cell and the neighboring cells to a 2D plane; and sort the neighboring cells in a counter-clockwise or clockwise order around the cell in the 2D plane.

17. The apparatus of claim 16, wherein the one or more processors are configured to:

form a plurality of vectors, each one of the plurality of vectors is defined by the cell and one cell of the neighboring cells;

determine a set of absolute inner products for each axis of three coordinate axes, wherein each absolute inner product in the set of absolute inner products is formed between a vector representative of a corresponding coordinate axis and a respective one vector of the plurality of vectors;

determine a minimum absolute inner product for the set of absolute inner products; and determine a coordinate axis as the projection direction, wherein the coordinate axis corresponds to a maximum of the three minimum absolute inner products for the three sets of absolute inner products.

18. The apparatus of claim 11, wherein the one or more processors are configured to:

determine a bit for the each one of the sub-cells, wherein the bit indicates whether a corresponding sub-cell is empty;

form a bit string using the determined bits for the sub-cells in response to the traversal order; and code the bit string into the bitstream.

19. The apparatus of claim 11, wherein the one or more processors are configured to:

decode a bit string from the bitstream; and determine a bit for a corresponding sub-cell in response to the traversal order, wherein the bit indicates whether the corresponding sub-cell is empty.

* * * * *